United States Patent
Howell

(10) Patent No.: US 11,686,455 B1
(45) Date of Patent: Jun. 27, 2023

(54) RECEIVER SPEED RING AND ASSOCIATED METHOD(S)

(71) Applicant: William Doug Howell, Spring Hill, TN (US)

(72) Inventor: William Doug Howell, Spring Hill, TN (US)

( * ) Notice: Subject to any disclaimer, the term of this patent is extended or adjusted under 35 U.S.C. 154(b) by 0 days.

(21) Appl. No.: 17/648,278

(22) Filed: Jan. 18, 2022

Related U.S. Application Data

(60) Provisional application No. 63/138,502, filed on Jan. 17, 2021.

(51) Int. Cl.
  *F21V 17/00*  (2006.01)
  *G03B 15/03*  (2021.01)
  *F21V 17/10*  (2006.01)
  *F21V 17/12*  (2006.01)
  *F21V 17/14*  (2006.01)
  *F21V 17/06*  (2006.01)

(52) U.S. Cl.
  CPC .......... *F21V 17/002* (2013.01); *F21V 17/005* (2013.01); *F21V 17/10* (2013.01); *F21V 17/12* (2013.01); *F21V 17/14* (2013.01); *G03B 15/03* (2013.01); *F21V 17/06* (2013.01)

(58) Field of Classification Search
  CPC ...... F21V 17/002; F21V 17/005; F21V 17/06; F21V 17/10; F21V 17/12; F21V 17/14; G03B 15/03
  See application file for complete search history.

(56) References Cited

U.S. PATENT DOCUMENTS

| | | | |
|---|---|---|---|
| 9,417,506 B1* | 8/2016 | Tirosh | G03B 15/06 |
| 2012/0189292 A1* | 7/2012 | Kim | G03B 15/03 |
| | | | 396/198 |
| 2017/0003574 A1* | 1/2017 | Choi | H05B 47/19 |

(Continued)

FOREIGN PATENT DOCUMENTS

DE   102019132337 A1 *  6/2021

OTHER PUBLICATIONS

CFomito Photo Studio Profoto Speedring to Bowens Mount Converter Monolight Interchangeable Adapter Ring [online]. Amazon, 2019 [retrieved on Feb. 23, 2023]. Retrieved from the Internet: <URL: www.amazon.com/Profoto-Speedring-Converter-Monolight-Interchangeable/dp/B07WS63JY3 > (Year: 2019).*

(Continued)

*Primary Examiner* — Leah Simone Macchiarolo
(74) *Attorney, Agent, or Firm* — Ashkan Najafi

(57) ABSTRACT

A receiver speed ring configured to facilitate a safe way of mounting an associated light modifier to both a Balcar-type light source and a Bowens-type light source via a tube with outwardly protruding tabs as well as holes and slots that are punched into the tube, instead of the flared flange, which allows for a quick change between different light mounting systems (e.g., Balcar-type, Bowens-type) without obscuring or impeding a flash tube. The receiver speed ring includes a cylindrical hollow tube having a constant diameter and provided with a circumferential outer surface having a centrally registered longitudinal axis. The speed ring also includes a non-flared outer edge, a plurality of juxtaposed holes, a plurality of juxtaposed slots, and a plurality of juxtaposed outwardly protruding tabs are provided.

20 Claims, 13 Drawing Sheets

(56) References Cited

U.S. PATENT DOCUMENTS

2018/0074388 A1* 3/2018 Zeng .................. G03B 17/56
2019/0011808 A1* 1/2019 Pizzo .................. G03B 17/14

OTHER PUBLICATIONS

DSLRKIT 95mm Mount to Bowens Mounts Ring Studio Adapter Flash Strobe 160W 250W 300W [online]. Amazon, 2014 [retrieved on Feb. 23, 2023]. Retrieved from the Internet: <URL: in office action > (Year: 2014).*

Walfront Photo Studio Elinchrom Speedring to Bowens Mount Converter Adapter Ring for Bowens Mount Flash Light Softbox [online]. Amazon, 2020 [retrieved on Feb. 23, 2023]. Retrieved from the Internet: <URL: in office action > (Year: 2020).*

* cited by examiner

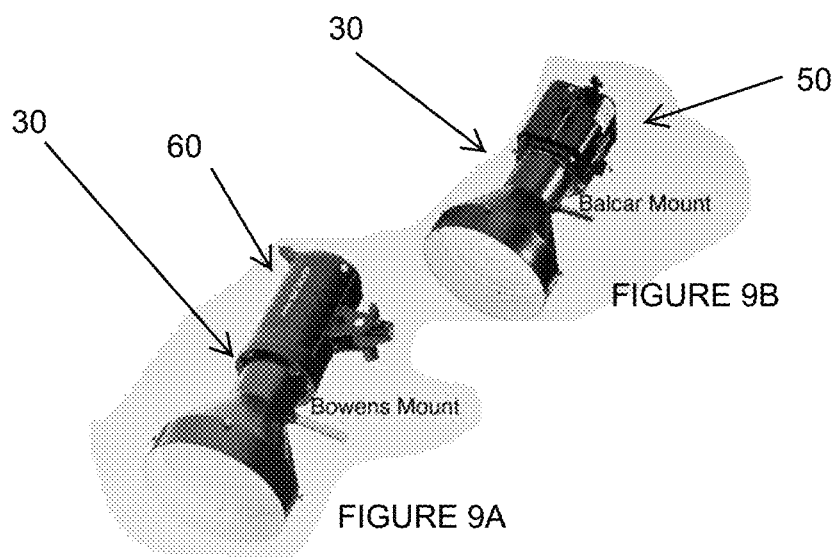
FIGURE 9A
FIGURE 9B
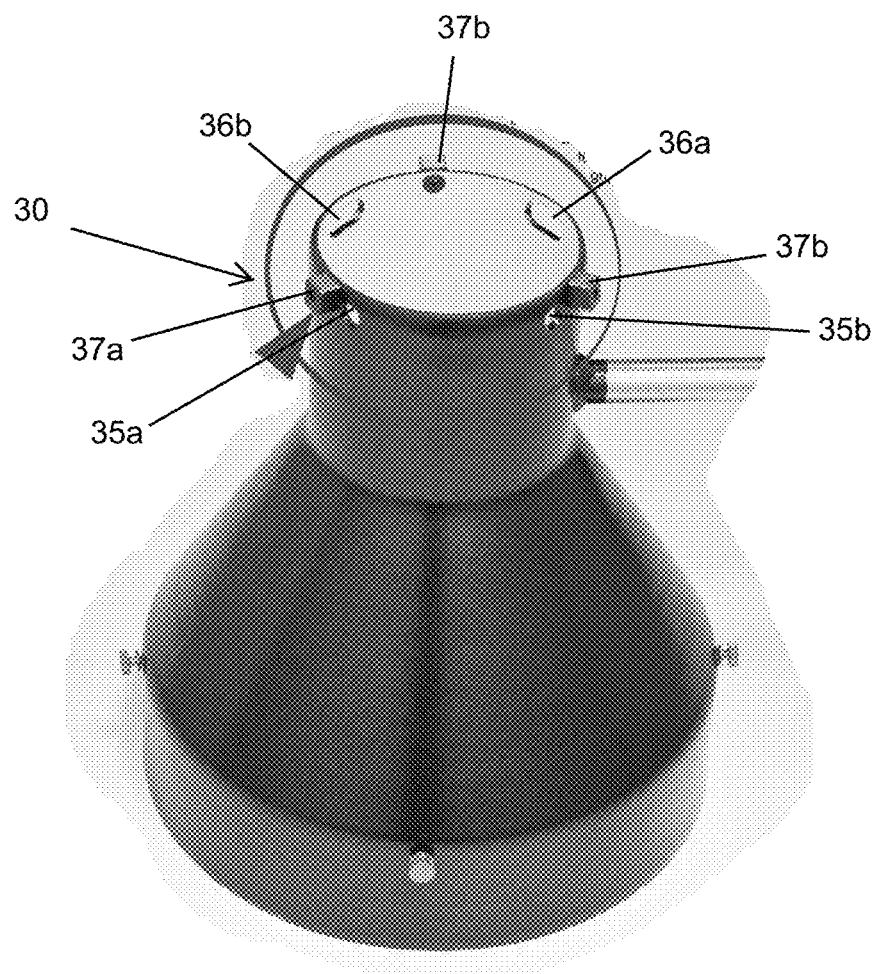
FIGURE 9

RECEIVER SPEED RING AND ASSOCIATED METHOD(S)

CROSS REFERENCE TO RELATED APPLICATIONS

This is a non-provisional patent application that claims priority to and benefit of U.S. provisional patent application No. 63/138,502 filed Jan. 17, 2021, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to light modifier speed rings and, more particularly, to a receiver speed ring configured to facilitate a safe way of mounting an associated light modifier to both a Balcar-type light source and a Bowens-type light source via a tube with outwardly protruding tabs as well as holes and slots that are punched into the tube, instead of the flared flange, which allows for a quick change between different light mounting systems (e.g., Balcar-type, Bowens-type) without obscuring or impeding a flash tube.

Prior Art

A photographer may use any number of lighting techniques when photographing an item or subject. Typically, a light source is directed either directly or indirectly at the subject or item. One commonly used lighting accessory is a speed ring. The speed ring acts as an interface between a light source and other lighting accessories such as umbrellas, Soft boxes, tripods, monopods etc. The light source may be coupled to the speed ring and directed at various angles and/or points of a soft box or other lighting accessory. The light from the light source may reflect off or pass through the lighting accessory to achieve a desired lighting effect.

However, use of a speed ring and light source combination may limit the lighting techniques used by a photographer as each speed ring may typically be coupled to only one light source. Additionally, the sizes of the speed rings and light sources may not be universal. Thus, one brand of light source may not fit a different manufacturers' speed ring. Still yet another disadvantage of using speed rings is that the speed ring and the associated light source are typically bulky and may take up significant storage space Accordingly, a need remains for receiver speed ring in order to overcome at least one of the above-noted shortcomings. The exemplary embodiment(s) satisfy such a need by a receiver speed ring configured to facilitate a safe way of mounting an associated light modifier to both a Balcar-type light source and a Bowens-type light source via a tube with outwardly protruding tabs as well as holes and slots that are punched into the tube, instead of the flared flange, that is convenient and easy to use, lightweight yet durable in design, versatile in its applications, and designed for a quick change between different light mounting systems (e.g., Balcar-type, Bowens-type) without obscuring or impeding a flash tube.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a receiver speed ring configured to facilitate a safe way of mounting an associated light modifier to both a Balcar-type light source and a Bowens-type light source via a tube with outwardly protruding tabs as well as holes and slots that are punched into the tube, instead of the flared flange, which allows for a quick change between different light mounting systems (e.g., Balcar-type, Bowens-type) without obscuring or impeding a flash tube. These and other objects, features, and advantages of the non-limiting exemplary embodiment(s) are provided by a receiver speed ring configured to facilitate a safe way of interchangeably mounting an associated light modifier to both a Balcar-type light source and a Bowens-type light source. Such a receiver speed ring includes a cylindrical hollow tube having a constant diameter and provided with a circumferential outer surface having a centrally registered longitudinal axis. The cylindrical hollow tube further includes a non-flared outer edge, a plurality of juxtaposed holes, a plurality of juxtaposed slots, and a plurality of juxtaposed outwardly protruding tabs. The holes, the slots, and the outwardly protruding tabs are configured to facilitate a quick change between both a Balcar-type light source and a Bowens-type light source without obscuring or impeding a flash tube.

In a non-limiting exemplary embodiment, the plurality of juxtaposed holes includes two holes spaced apart approximately 90 degrees and disposed within a first hemisphere.

In a non-limiting exemplary embodiment, the plurality of juxtaposed slots includes two slots spaced apart approximately 90 degrees and disposed within a second hemisphere.

In a non-limiting exemplary embodiment, the plurality of tabs includes three tabs spaced apart approximately 120 degrees and disposed at the first hemisphere and the second hemisphere.

In a non-limiting exemplary embodiment, the tabs have a substantially square cross-section.

In a non-limiting exemplary embodiment, one of the holes is diametrically opposed from one of the slots.

In a non-limiting exemplary embodiment, two of the tabs are disposed proximate to the two holes, respectively.

In a non-limiting exemplary embodiment, a third one of the tabs is intermediately and equidistantly disposed between the two slots. Advantageously, two of the tabs are disposed proximate to the two slots, respectively.

In a non-limiting exemplary embodiment, each of the holes, the slots, and the tabs are equidistantly spaced apart from the centrally registered longitudinal axis.

The present disclosure further includes a method of interchangeably mounting a receiver speed ring and associated light modifier to both a Balcar-type light source and a Bowens-type light source. Such a method includes the initial step of: obtaining a cylindrical hollow tube having a constant diameter and provided with a circumferential outer surface having a centrally registered longitudinal axis, the cylindrical hollow tube including a non-flared outer edge, a plurality of juxtaposed holes, a plurality of juxtaposed slots, and a plurality of juxtaposed outwardly protruding tabs.

The method further includes the steps of: obtaining a Balcar-type light source; obtaining a Bowens-type light source; connecting the cylindrical hollow tube to the Balcar-type light source; disconnecting the cylindrical hollow tube from the Balcar-Type light source; and connecting the cylindrical hollow tube to the Bowens-type light source without modifying the cylindrical hollow tube, the Balcar-type light source, and the Bowens-type light source. Advantageously, the holes, the slots, and the outwardly protruding tabs are configured to facilitate a quick change between both a Balcar-type light source and a Bowens-type light source without obscuring or impeding any existing flash tube.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

FIG. 9 is another perspective view of the light modifier with a receiver speed ring in accordance with the present disclosure;

FIG. 9A is another perspective view of the receiver speed ring attached to a Bowens-type light source;

FIG. 9B is another perspective view of the receiver speed ring attached to a Balcar-type light source;

Figure 1:
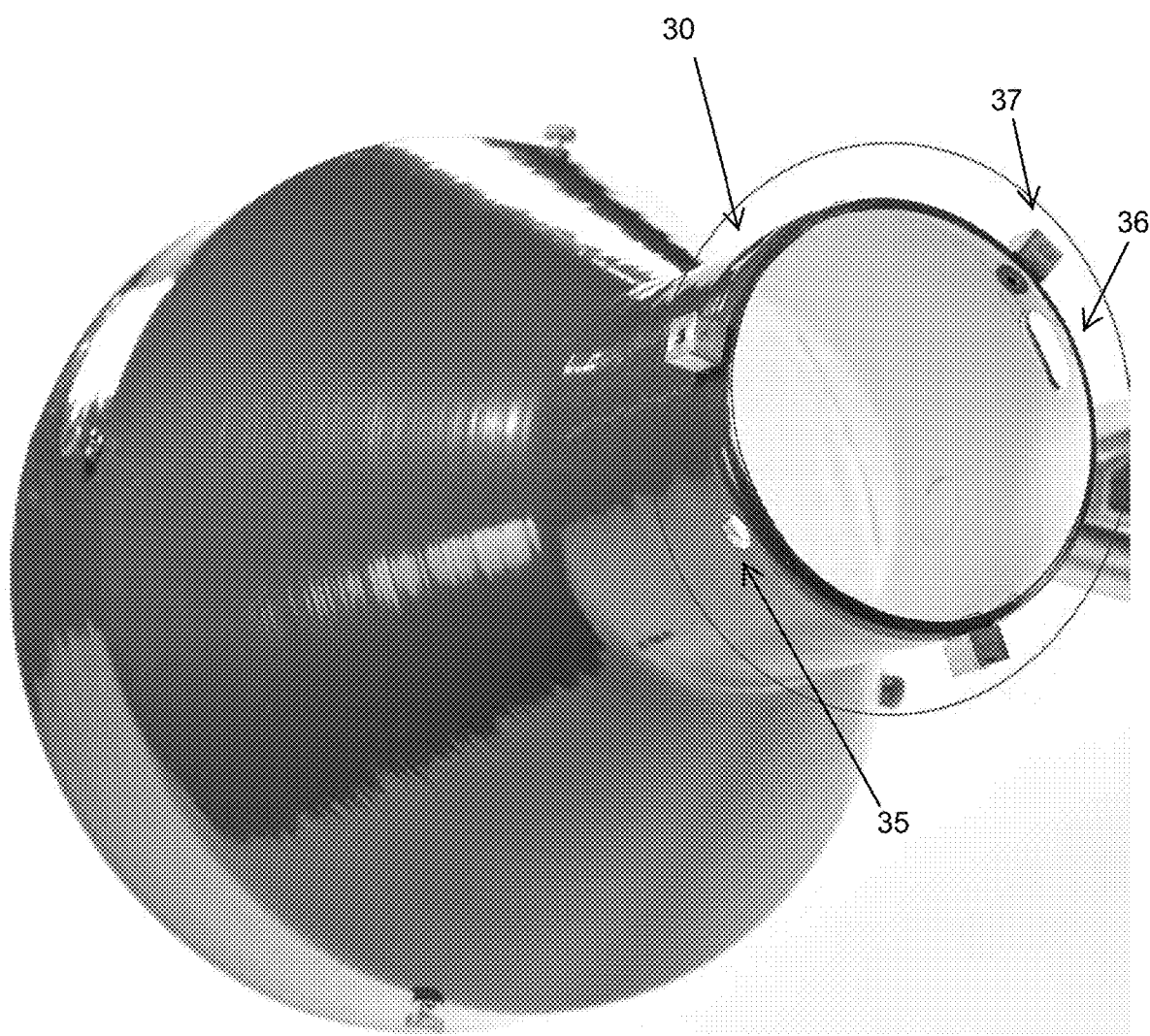
FIG. 1 is a perspective view of a light modifier having a receiver speed ring configured to facilitate a safe way of mounting the associated light modifier to both a Balcar-type light source and a Bowens-type light source, in accordance with a non-limiting exemplary embodiment of the present disclosure.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about," "generally," and "approximately" mean nearly and in the context of a numerical value or range set forth means±15% of the numerical.

If used herein, "substantially" means largely if not wholly that which is specified but so close that the difference is insignificant.

The terms "receiver speed ring" and "speed ring" are interchangeably used in the present disclosure.

A non-limiting exemplary embodiment(s) of the present disclosure is referred to generally in FIGS. 1-22 and is intended to provide a receiver speed ring 30 configured to facilitate a safe way of mounting an associated light modifier to both a Balcar-type light source 50 and a Bowens-type light source 60 via a tub e with outwardly protruding tabs 17 as well as holes 15 and slots 16 that are punched into the tube 31, instead of the flared flange 52, which allows for a quick change between different light mounting systems (e.g., Balcar-type 50, Bowens-type 60) without obscuring or impeding a flash tube 31. It should be understood that the exemplary embodiment(s) may be used to modify light emitted from a variety of light sources, and should not be limited to any particular Balcar-type 50 and Bowens-type 60 light sources described herein.

Advantageously, in FIG. 1, the structural configuration of the present disclosure permits Balcar-type 50 mechanical fingers 56 to jut out through the receiver 30, via two slots 36 and two holes 35. It leaves room for three cubed metal tabs 37, that are necessary for attachment to a Bowens-type light source 60. This overcome the problem of the conventional way of attaching a light modifier to a Balcar-type light source 50, which cannot be attached to the metal cubed tabs 37.

Figures 2, 3:
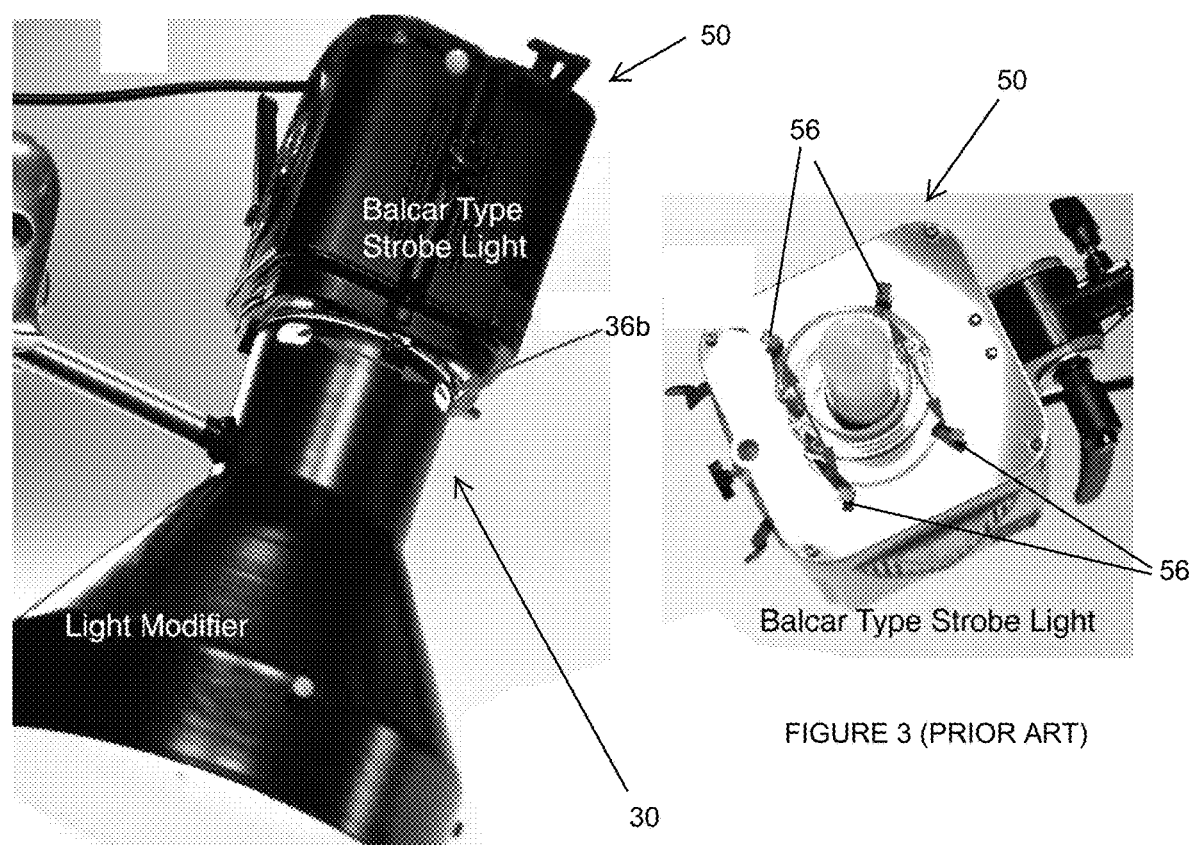
FIG. 2 is a perspective view of the speed ring attached to a Balcar-type light source.
FIG. 3 is a perspective view of a Balcar-type light source having fingers protruding therefrom.
Figure 5:
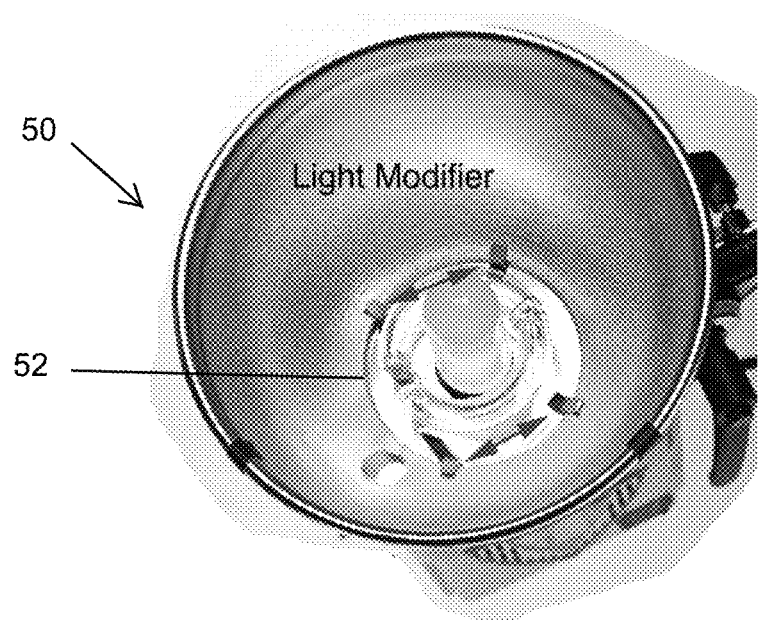
FIG. 5 is a perspective view of the Balcar-type light source having a conventional light modifier attached to its fingers.
Figure 4:
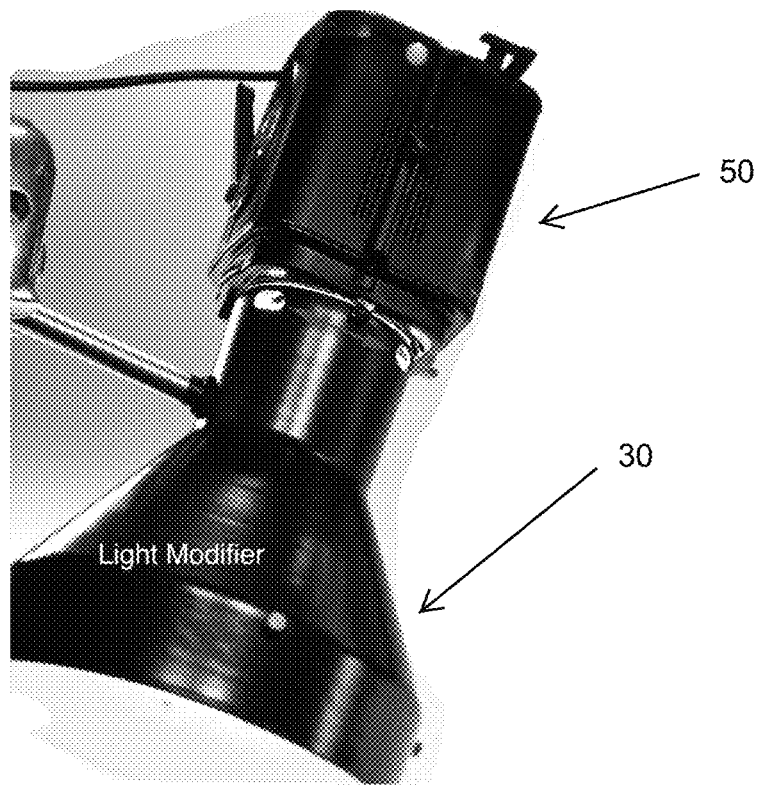
FIG. 4 is another perspective view of the receiver speed ring attached to a Balcar-type light source.

FIG. 2 illustrates the present disclosure's structural configuration for connecting to a Balcar-type strobe light 50. The holes 35 and slots 36 receive therethrough the strobe light's fingers 56 and the cubed tabs 37 do not impede such a connection. FIG. 3 illustrates the finger 56 protrusions of a Balcar-type strobe light 50, which conventionally engage an interior peripheral flanged edge 52 of a conventional light modifier as shown in FIG. 5. FIG. 4 shows the present disclosure's slots 36 and holes 35 that receive therethrough the fingers 56 of a Balcar-type light source 50.

Figure 6:
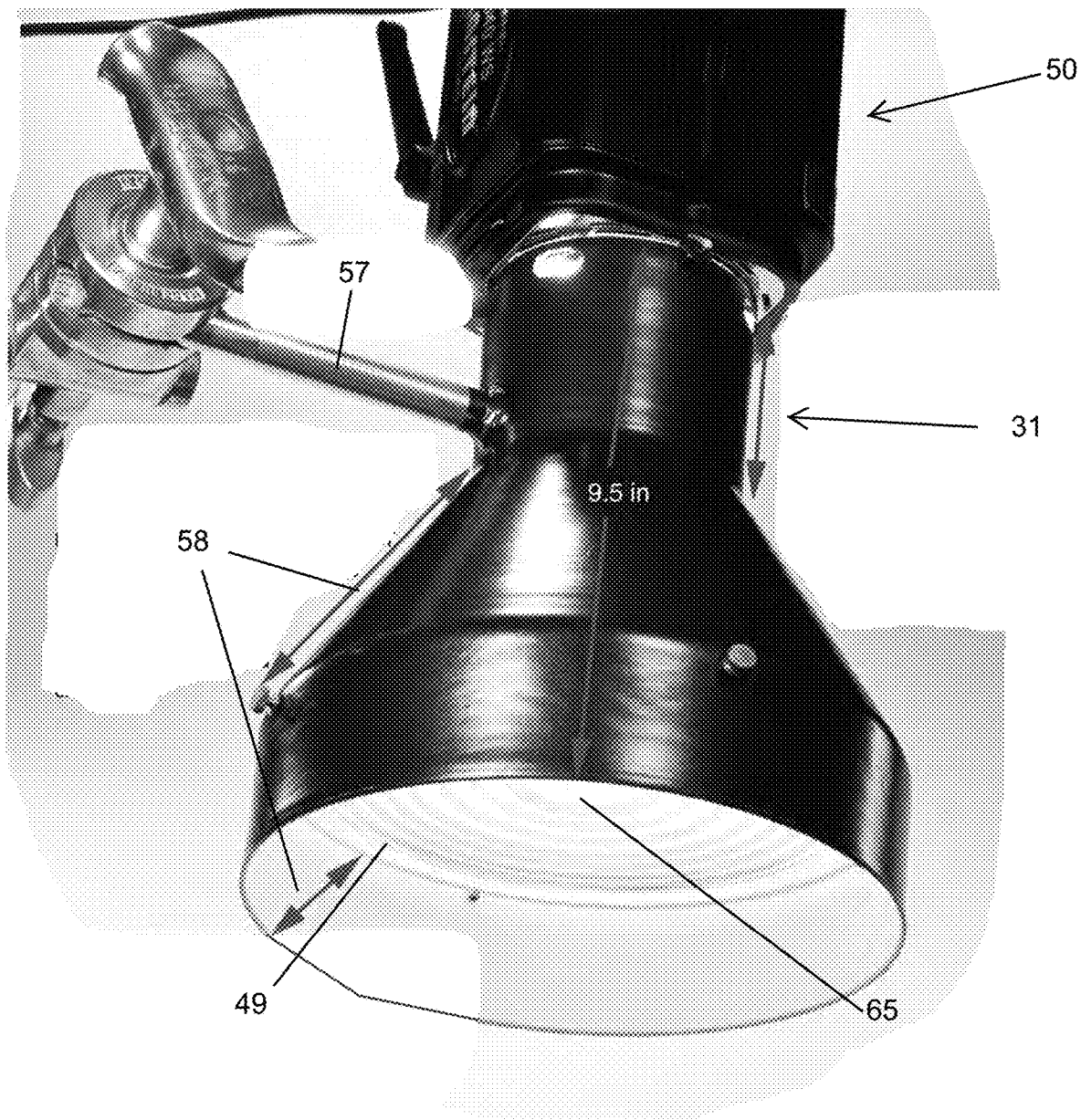
FIG. 6 is another perspective view of the receiver speed ring attached to a Balcar-type light source.

FIG. 6 shows a built in ⅝-inch baby pin 57, which gives several grip options. The cone 58 collimates the residual light. Thus, the light is not lost, as is typical of other Fresnel light modifiers on the market. Conventional Fresnels lose light because they use a cylinder structure (e.g., Mole-Richard and ARRI). Advantageously, the three-inch tube 31 collects initial flash bursts into a critical single point light source. This single point light source illuminates the Fresnel 48 bullseye 65 first. Then, the light radiates outward through the concentric rings 49 of the Fresnel 48. Conventional Fresnels are just a straight tube 31 or cylinder and do not provide the advantage of the present disclosure.

Figure 7:
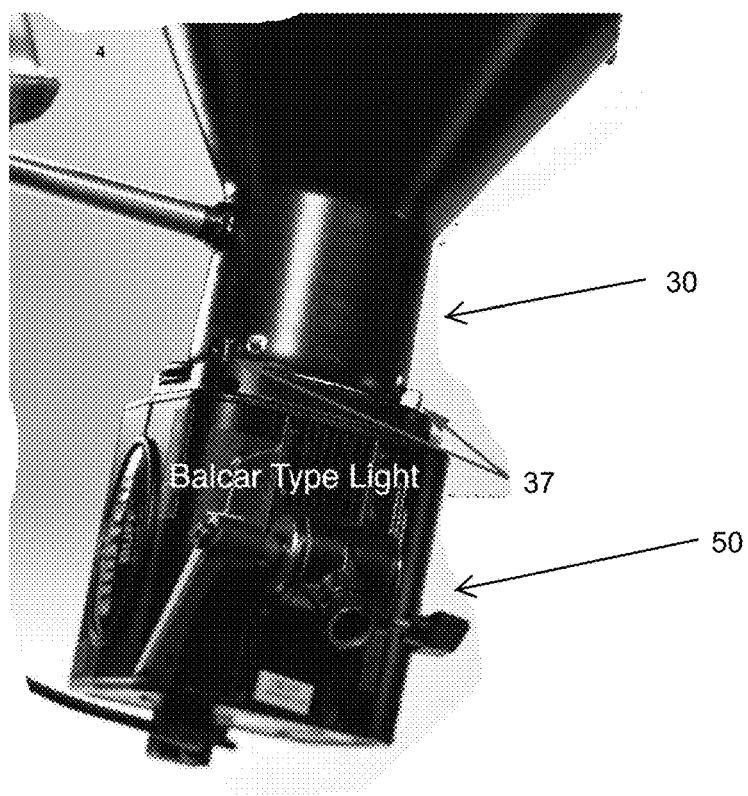
FIG. 7 is another perspective view of the receiver speed ring attached to the Balcar-type light source.
Figure 8:
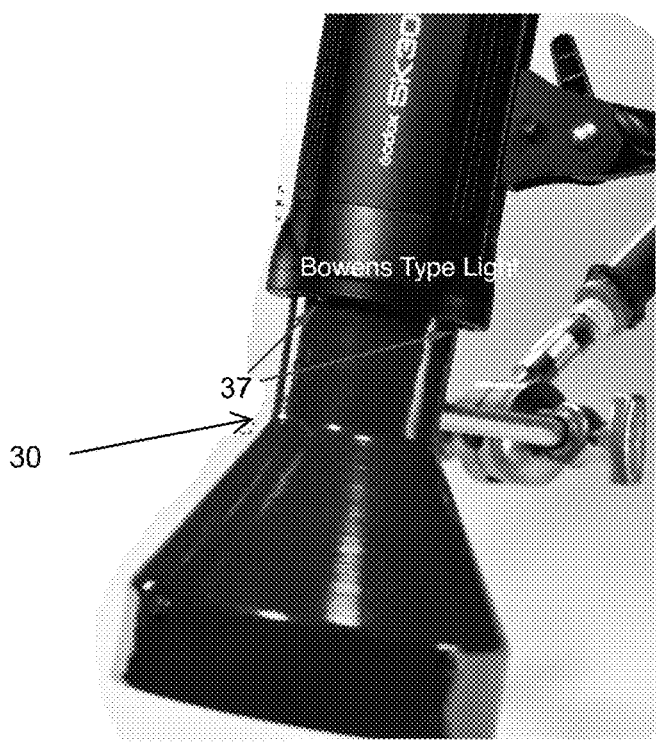
FIG. 8 is a perspective view of the receiver speed ring attached to a Bowens-type light source.
Figure 10:
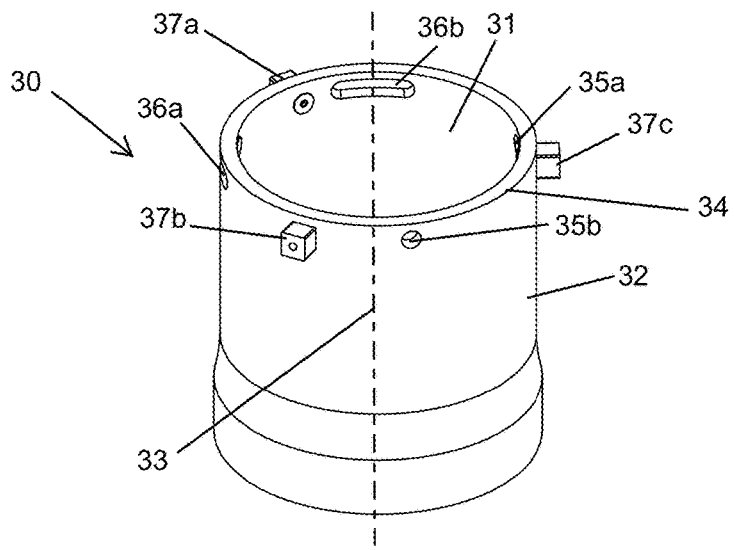
FIG. 10 is a perspective of the receiver speed ring, in accordance with a non-limiting exemplary embodiment of the present disclosure.
Figure 11:
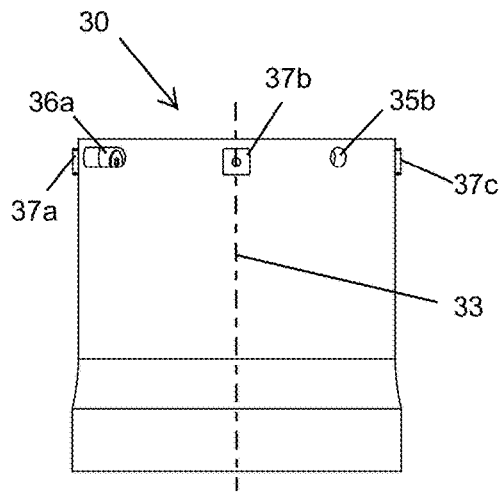
FIG. 11 is a front elevational view of the receiver speed ring shown in FIG. 10.
Figure 12:
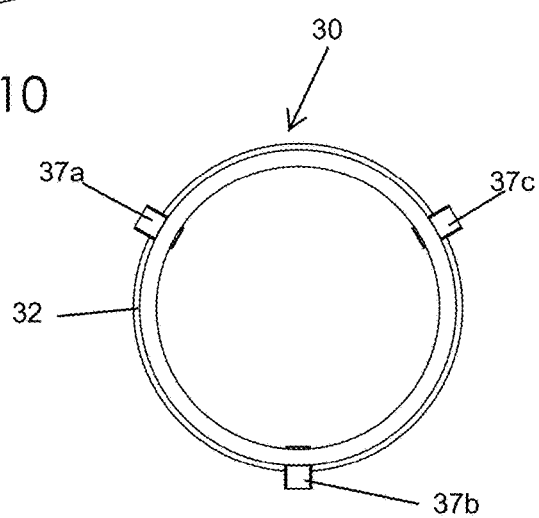
FIG. 12 is a top plan view of the receiver speed ring shown in FIG. 10.
Figure 13:
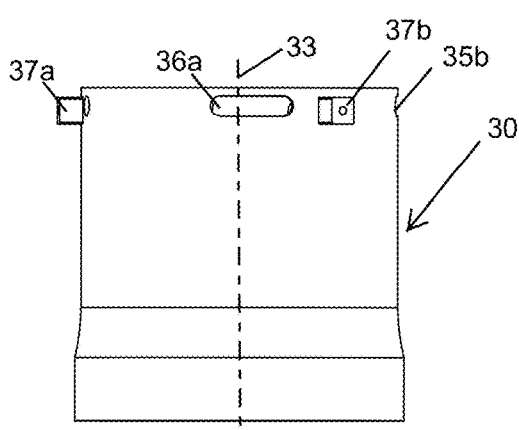
FIG. 13 is a left-side elevational view of the receiver speed ring shown in FIG. 10.
Figure 14:
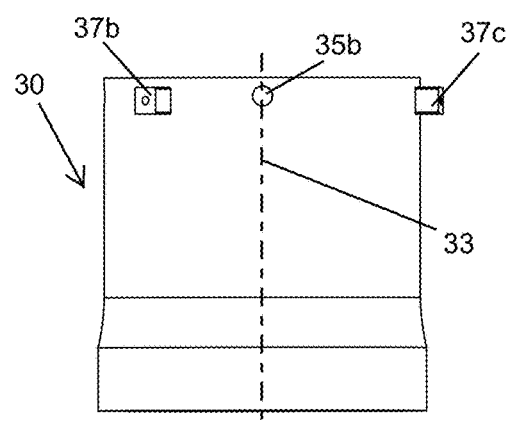
FIG. 14 is a right-side elevational view of the receiver speed ring shown in FIG. 10.
Figure 15:
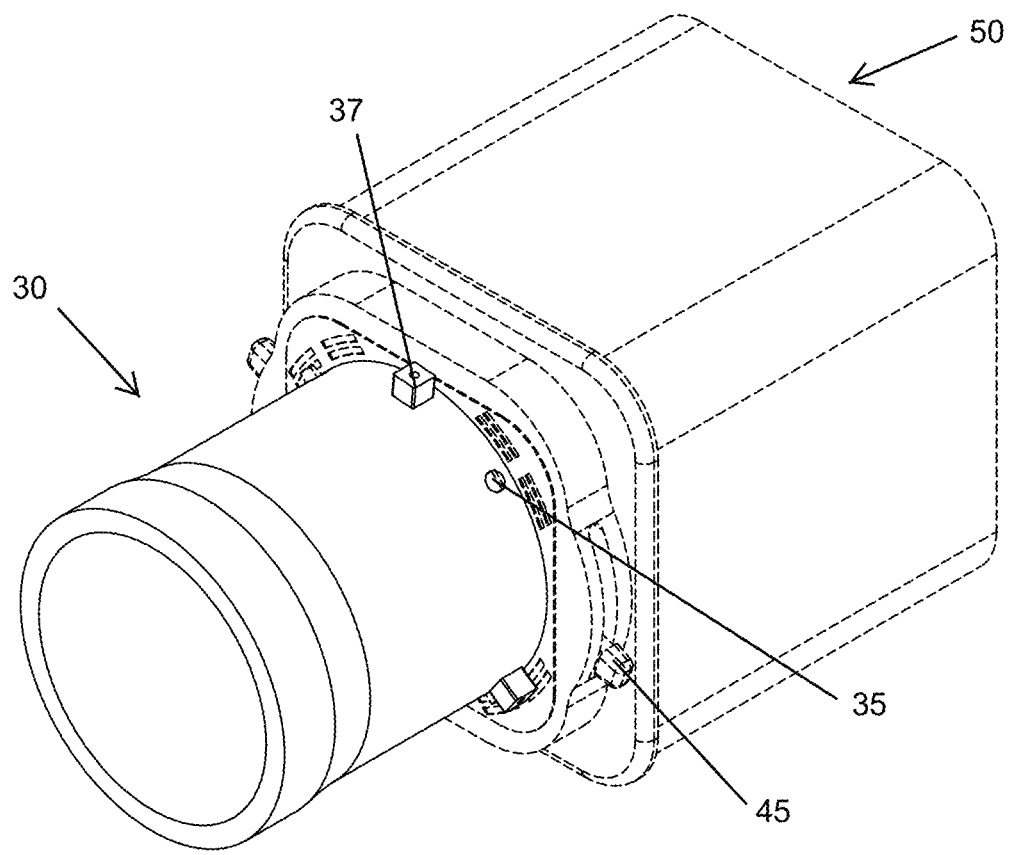
FIG. 15 is a perspective view of the receiver speed ring attached to a Balcar-type light source, in accordance with a non-limiting exemplary embodiment of the present disclosure.
Figure 16:
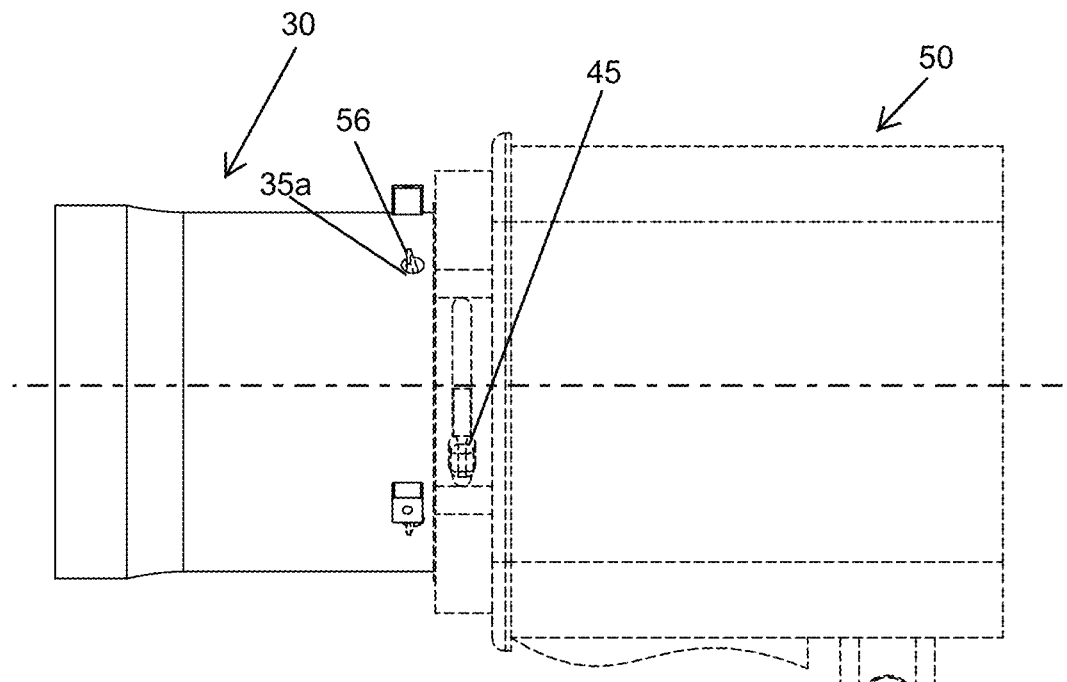
FIG. 16 is a side elevational view of the receiver speed ring shown in FIG. 15.
Figure 17:
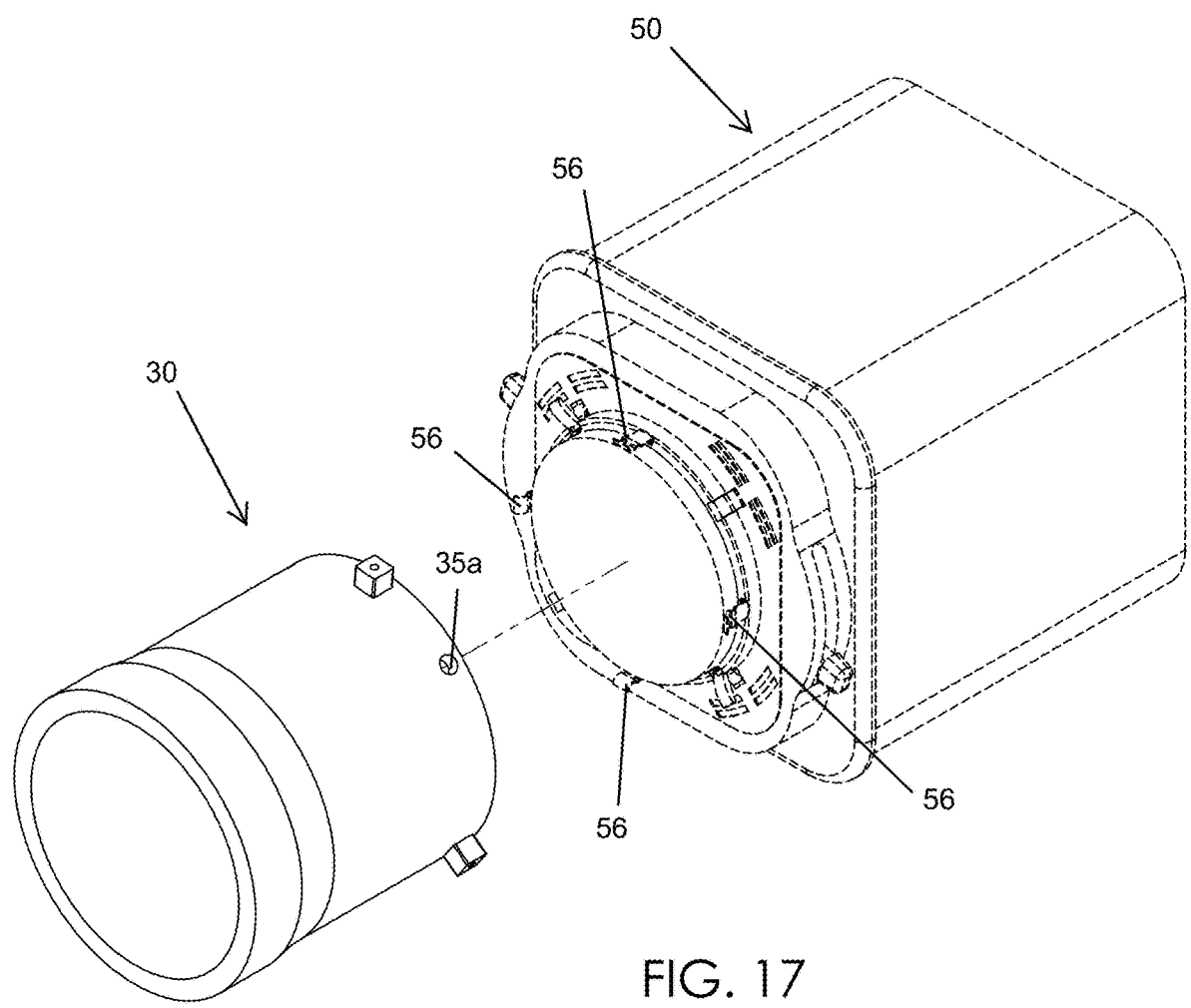
FIG. 17 is an exploded view of receiver speed ring and Balcar-type light source shown in FIG. 10.
Figure 18:
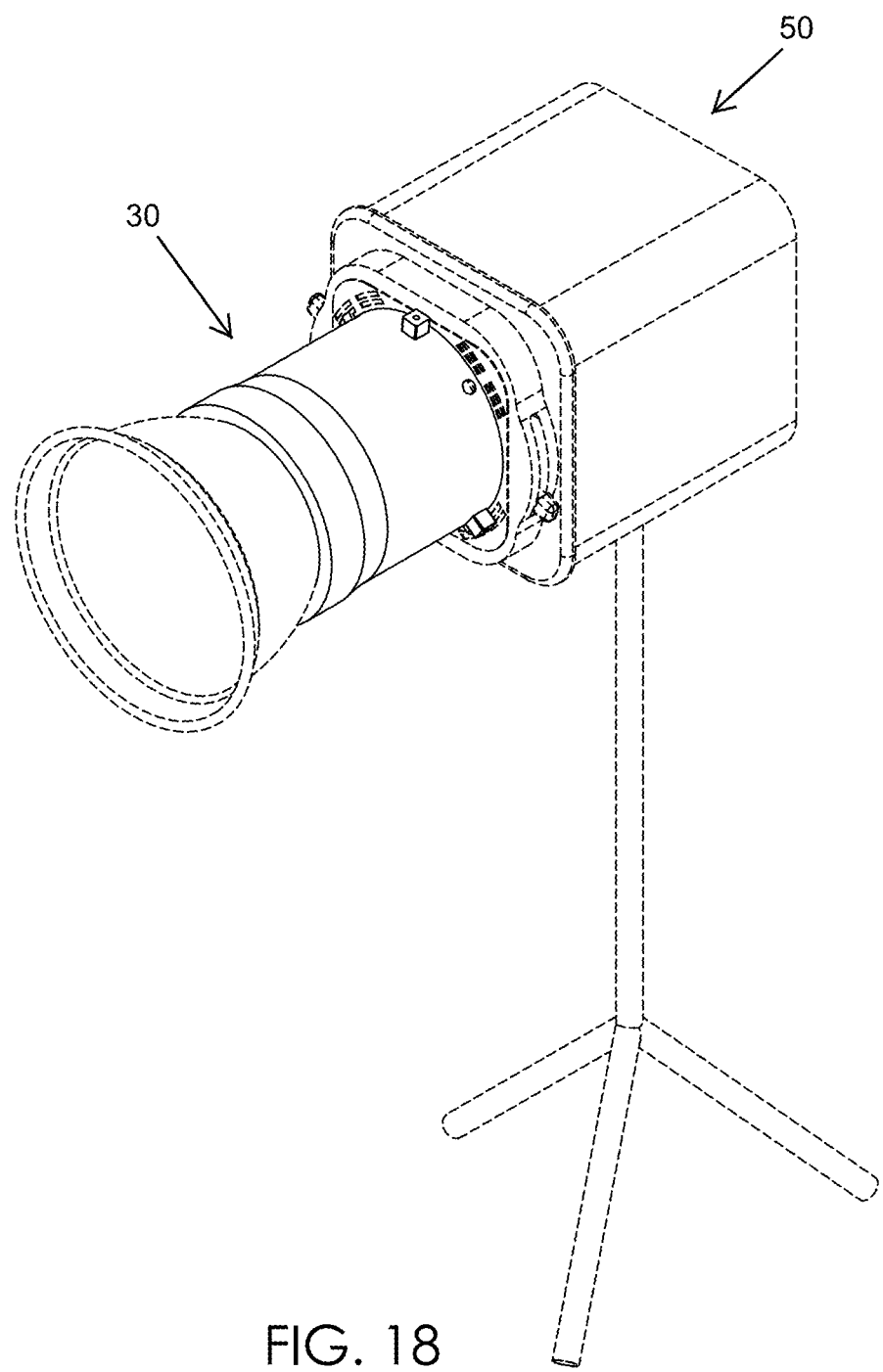
FIG. 18 is a perspective view of the receiver speed ring and Balcar-type light source supported on a tripod.
Figure 19:
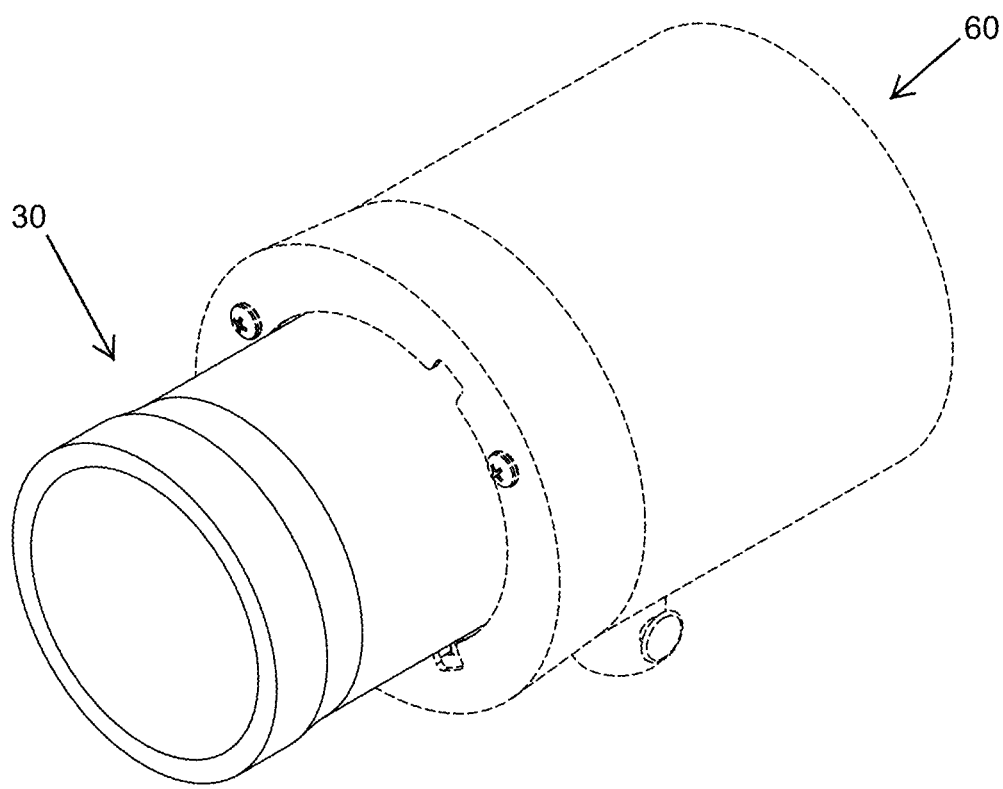
FIG. 19 is a perspective of the receiver speed ring attached to a Bowens-type light source, in accordance with a non-limiting exemplary embodiment of the present disclosure.
Figure 20:
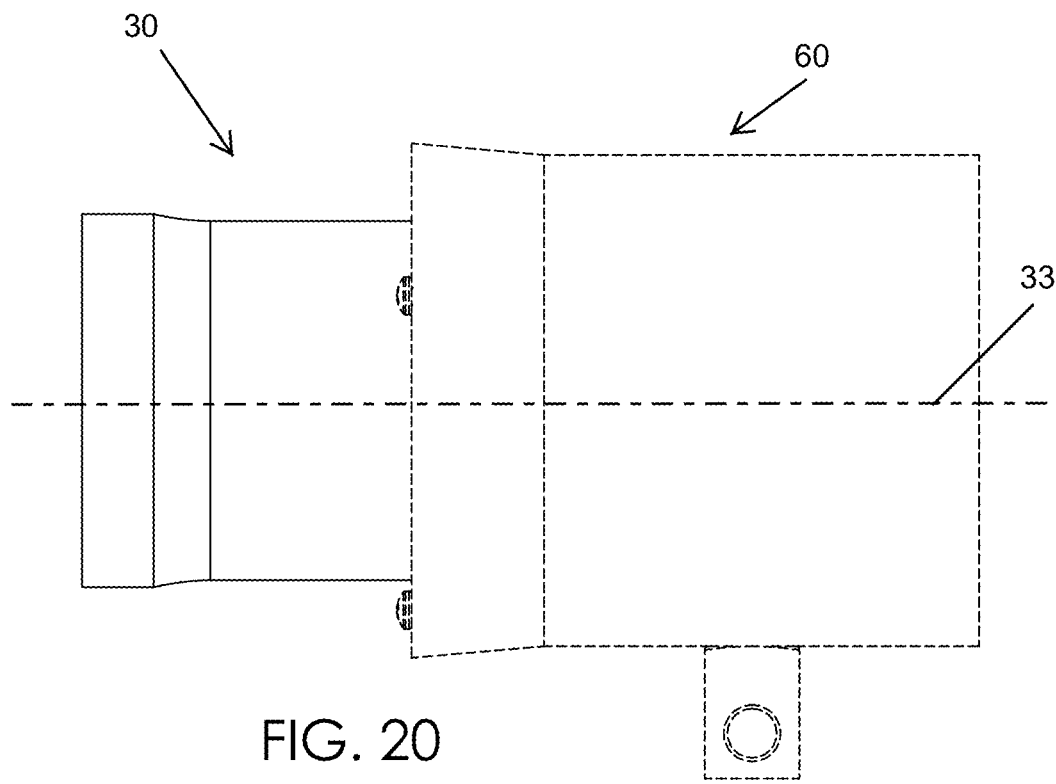
FIG. 20 is a side elevational view of the receiver speed ring attached to the Bowens-type light source shown in FIG. 19.
Figure 21:
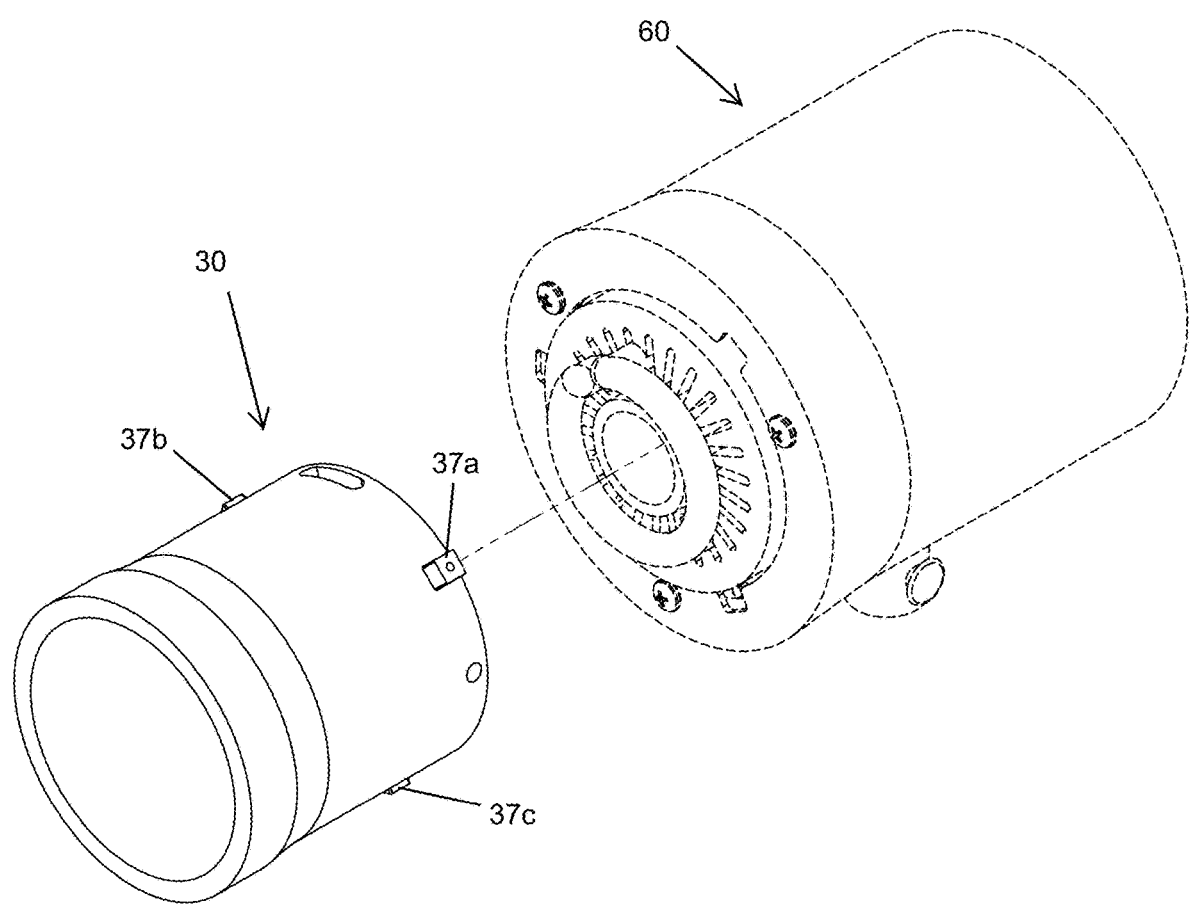
FIG. 21 is an exploded view of the receiver speed ring detached from the Bowens-type light source shown in FIG. 19.
Figure 22:
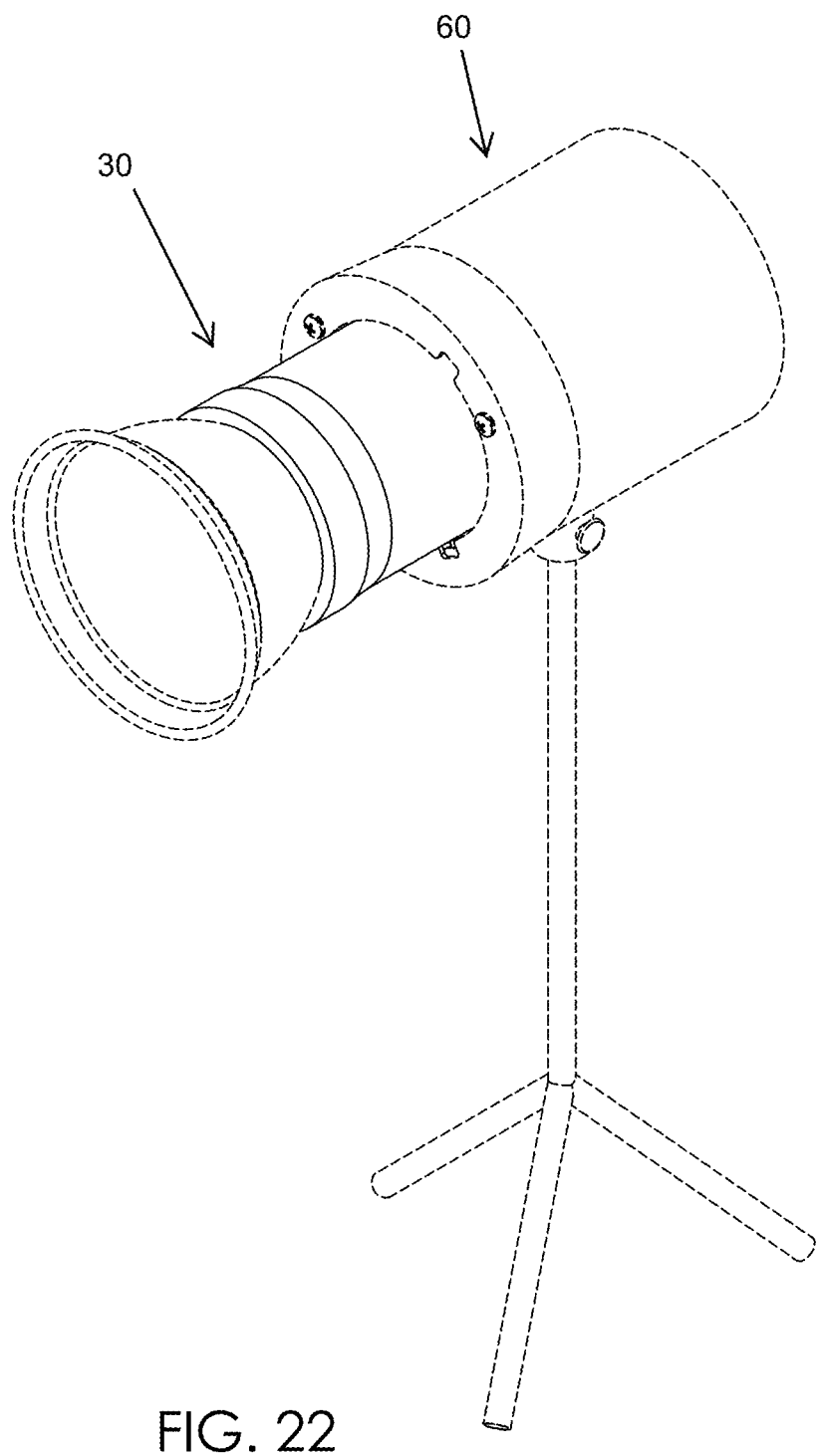
FIG. 22 is a perspective view of the receiver speed ring attached to the Bowens-type light source shown in FIG. 19, and supported on a tripod.

Referring to FIGS. 7 and 8, the combination of cubed tabs 37, slots 36, and holes 35 are shown at a proximal end of a cylindrical section 31 attached to the Fresnel 48. Thus, the slots 36 and holes 35 are used to receive Balcar-type fingers 56 and the cubed tabs 37 are used to be seated and engage the inside collar of the Bowens-type light source 60. Such cubed tabs 37 are locked into place via a lever locking mechanism 45 provided by the Bowens-type light source 60.

FIGS. 9-9B show additional views of the receiver speed ring 30 retrofitted onto existing Balcar-type 50 and Bowens-type 60 light sources (e.g., strobe light sources).

Referring to FIGS. 1-22 in general, the receiver speed ring 30 includes a hollow tube 31 provided with a circumferential outer surface 32 having a centrally registered longitudinal axis 33 and including a non-flared outer edge 34, a plurality of juxtaposed holes 35 (35a, 35b), a plurality of juxtaposed slots 36 (36a, 36b), and a plurality of juxtaposed outwardly protruding tabs 37 (37a, 37b, 37c). Advantageously, the holes 35, the slots 36, and the outwardly protruding tabs 37 are configured to facilitate a quick change between both a Balcar-type light source 50 and a Bowens-type light source 60. The holes 35 reduce the amount of rotational movement of the speed ring after the fingers 56 56 are passed therethrough. The slots 36 allow more flexibility and tolerance for minimal rotational adjustment of the speed ring relative to the fingers 56 of the Balcar-type light source. Such a structural configuration yields the new, useful, and unpredicted result of enabling a user to succinctly interchange the speed ring between Balcar-type 50 and Bowens-type 60 light sources.

In a non-limiting exemplary embodiment, the plurality of juxtaposed holes 35 include two holes 35a, 35b spaced apart approximately 90 degrees and disposed within a first hemisphere 40. Such a structural configuration yields the new, useful, and unpredicted result of ensuring the speed ring is properly fitted to the light source.

In a non-limiting exemplary embodiment, the plurality of juxtaposed slots 36 include two slots 36a, 36b spaced apart approximately 90 degrees and disposed within a second hemisphere 41. Such a structural configuration yields the new, useful, and unpredicted result of ensuring the speed ring is properly fitted to the light source.

In a non-limiting exemplary embodiment, the plurality of tabs 37 include three tabs 37a, 37b, 37c spaced apart approximately 120 degrees and disposed at the first hemisphere 40 and the second hemisphere 41. Such a structural configuration yields the new, useful, and unpredicted result of ensuring the speed ring is properly fitted to the light source.

In a non-limiting exemplary embodiment, the tabs 37 each have a substantially square cross-section. Such a structural configuration yields the new, useful, and unpredicted result of ensuring the speed ring is accurately locked to a Bowens-type light source 60.

In a non-limiting exemplary embodiment, one of the holes 35a is diametrically opposed from one of the slots 36a. Such a structural configuration yields the new, useful, and unpredicted result of ensuring the speed ring is accurately locked to a Balcar-type light source 50.

In a non-limiting exemplary embodiment, two of the tabs 37c, 37b are disposed proximate to the two holes 35a, 35b, respectively. Such a structural configuration yields the new, useful, and unpredicted result of ensuring the speed ring is interchangeably attached to the Balcar-type and Bowens-type light source 60.

In a non-limiting exemplary embodiment, a third one of the tabs 37a is intermediately and equidistantly disposed between two slots 36a, 36b. Such a structural configuration yields the new, useful, and unpredicted result of ensuring the speed ring is interchangeably attached to the Balcar-type and Bowens-type light source 60.

In a non-limiting exemplary embodiment, two of the tabs 37a, 37b are disposed proximate to two slots 36b, 36a, respectively. Such a structural configuration yields the new, useful, and unpredicted result of ensuring the speed ring is interchangeably attached to the Balcar-type and Bowens-type light source 60.

In a non-limiting exemplary embodiment, each of the holes 35a, 35b, the slots 36a, 36b, and the tabs 37a, 37b, 37c are equidistantly and radially spaced apart from the centrally registered longitudinal axis 33. Such a structural configuration yields the new, useful, and unpredicted result of ensuring the speed ring is interchangeably attached to the Balcar-type and Bowens-type light source 60.

The present disclosure further includes a method of interchangeably mounting a receiver speed ring 30 and associated light modifier to both a Balcar-type light source 50 and a Bowens-type light source 60. Such a method includes the initial step of: obtaining a cylindrical hollow tube 31 having a constant diameter and provided with a circumferential outer surface 32 having a centrally registered longitudinal axis 33, the cylindrical hollow tube 31 including a non-flared outer edge 34, a plurality of juxtaposed holes 35, a plurality of juxtaposed slots 36, and a plurality of juxtaposed outwardly protruding tabs 37.

The method further includes the steps of: obtaining a Balcar-type light source 50; obtaining a Bowens-type light source 60; connecting the cylindrical hollow tube 31 to the Balcar-type light source 50; disconnecting the cylindrical hollow tube 31 from the Balcar-type light source 50; and connecting the cylindrical hollow tube 31 to the Bowens-type light source 60 without modifying the cylindrical hollow tube 31, the Balcar-type light source 50, and the Bowens-type light source 60. Advantageously, the holes 35, the slots 36, and the outwardly protruding tabs 37 are configured to facilitate a quick change between both a Balcar-type light source 50 and a Bowens-type light source 60 without obscuring or impeding any existing flash tube 31.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. § 1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A receiver speed ring configured to facilitate a safe way of interchangeably mounting an associated light modifier to both a Balcar-type light source and a Bowens-type light source, said receiver speed ring comprising:
   a hollow tube provided with a circumferential outer surface having a centrally registered longitudinal axis and including
   a non-flared outer edge,
   a plurality of juxtaposed holes,
   a plurality of juxtaposed slots, and
   a plurality of juxtaposed outwardly protruding tabs;
   wherein said holes, said slots, and said outwardly protruding tabs are configured to facilitate a quick change between both a Balcar-type light source and a Bowens-type light source without obscuring or impeding a flash tube.

2. The receiver speed ring of claim 1, wherein said plurality of juxtaposed holes comprises: two holes spaced apart approximately 90 degrees and disposed within a first hemisphere.

3. The receiver speed ring of claim 2, wherein said plurality of juxtaposed slots comprises: two slots spaced apart approximately 90 degrees and disposed within a second hemisphere.

4. The receiver speed ring of claim 3, wherein said plurality of tabs comprises: three tabs spaced apart approximately 120 degrees and disposed at said first hemisphere and said second hemisphere.

5. The receiver speed ring of claim 4, wherein said tabs have a substantially square cross-section.

6. The receiver speed ring of claim 4, wherein one of said holes is diametrically opposed from one of said slots.

7. The receiver speed ring of claim 4, wherein two of said tabs are disposed proximate to said two holes, respectively.

8. The receiver speed ring of claim 4, wherein a third one of said tabs is intermediately and equidistantly disposed between said two slots.

9. The receiver speed ring of claim 2, wherein two of said tabs are disposed proximate to said two slots, respectively.

10. The receiver speed ring of claim 1, wherein each of said holes, said slots, and said tabs are equidistantly spaced apart from the centrally registered longitudinal axis.

11. A receiver speed ring configured to facilitate a safe way of interchangeably mounting an associated light modifier to both a Balcar-type light source and a Bowens-type light source, said receiver speed ring comprising:
- a hollow tube provided with a circumferential outer surface having a centrally registered longitudinal axis and including
  - a non-flared outer edge,
  - a plurality of juxtaposed holes,
  - a plurality of juxtaposed slots, and
  - a plurality of juxtaposed outwardly protruding tabs;
- wherein said holes, said slots, and said outwardly protruding tabs are configured to facilitate a quick change between both a Balcar-type light source and a Bowens-type light source without obscuring or impeding a flash tube;
- wherein said hollow tube is cylindrical and has a constant diameter.

12. The receiver speed ring of claim 11, wherein said plurality of juxtaposed holes comprises: two holes spaced apart approximately 90 degrees and disposed within a first hemisphere.

13. The receiver speed ring of claim 12, wherein said plurality of juxtaposed slots comprises: two slots spaced apart approximately 90 degrees and disposed within a second hemisphere.

14. The receiver speed ring of claim 13, wherein said plurality of tabs comprises: three tabs spaced apart approximately 120 degrees and disposed at said first hemisphere and said second hemisphere.

15. The receiver speed ring of claim 14, wherein said tabs have a substantially square cross-section.

16. The receiver speed ring of claim 15, wherein one of said holes is diametrically opposed from one of said slots.

17. The receiver speed ring of claim 16, wherein two of said tabs are disposed proximate to said two holes, respectively.

18. The receiver speed ring of claim 17, wherein a third one of said tabs is intermediately and equidistantly disposed between said two slots; wherein two of said tabs are disposed proximate to said two slots, respectively.

19. The receiver speed ring of claim 18, wherein each of said holes, said slots, and said tabs are equidistantly spaced apart from the centrally registered longitudinal axis.

20. A method of interchangeably mounting a receiver speed ring and associated light modifier to both a Balcar-type light source and a Bowens-type light source, said method comprising the steps of:
- obtaining a cylindrical hollow tube having a constant diameter and provided with a circumferential outer surface having a centrally registered longitudinal axis, said cylindrical hollow tube including a non-flared outer edge, a plurality of juxtaposed holes, a plurality of juxtaposed slots, and a plurality of juxtaposed outwardly protruding tabs;
- obtaining a Balcar-type light source;
- obtaining a Bowens-type light source;
- connecting said cylindrical hollow tube to said Balcar-type light source;
- disconnecting said cylindrical hollow tube from said Balcar-Type light source; and
- connecting said cylindrical hollow tube to said Bowens-type light source without modifying said cylindrical hollow tube, said Balcar-type light source, and said Bowens-type light source;
- wherein said holes, said slots, and said outwardly protruding tabs are configured to facilitate a quick change between both a Balcar-type light source and a Bowens-type light source without obscuring or impeding a flash tube.

* * * * *